(12) United States Patent
Stuker (10) Patent No.: US 11,262,251 B2
(45) Date of Patent: Mar. 1, 2022

(54) DEVICE AND METHOD FOR MEASURING A LOAD

(71) Applicant: DIGI SENS AG, Murten (CH)

(72) Inventor: Olivier Stuker, Bern (CH)

(73) Assignee: Digi Sens AG, Murten (CH)

(*) Notice: Subject to any disclaimer, the term of this patent is extended or adjusted under 35 U.S.C. 154(b) by 0 days.

(21) Appl. No.: 16/494,925

(22) PCT Filed: Mar. 9, 2018

(86) PCT No.: PCT/CH2018/050009
§ 371 (c)(1),
(2) Date: Sep. 17, 2019

(87) PCT Pub. No.: WO2018/170610
PCT Pub. Date: Sep. 27, 2018

(65) Prior Publication Data
US 2020/0033202 A1 Jan. 30, 2020

(30) Foreign Application Priority Data

Mar. 21, 2017 (CH) .......................................... 360/17
Apr. 13, 2017 (CH) .......................................... 504/17

(51) Int. Cl.
*G01L 1/04* (2006.01)
*G01L 1/10* (2006.01)
(Continued)

(52) U.S. Cl.
CPC .................. *G01L 1/04* (2013.01); *G01L 1/10* (2013.01); *G01L 1/2206* (2013.01);
(Continued)

(58) Field of Classification Search
CPC . G01L 1/04; G01L 1/10; G01L 1/2206; G01L 5/0033; G01L 5/06; G01L 5/103;
(Continued)

(56) References Cited

U.S. PATENT DOCUMENTS

| 3,842,667 A | 10/1974 | Alexander et al. |
| 4,179,004 A | 12/1979 | Ebbinge |

(Continued)

FOREIGN PATENT DOCUMENTS

GB  1049151  11/1966

OTHER PUBLICATIONS

Foster, Keir, International Search Report for PCT/CH2018/050009 (dated Oct. 8, 2018).

*Primary Examiner* — Octavia Hollington
(74) *Attorney, Agent, or Firm* — Henry Patent Law Firm PLLC (57) ABSTRACT

The invention relates to a load detection unit having a spring-elastic load carrier assembly for receiving the load (10) and a sensor (3) for the deformation of the load carrier assembly, which occurs under the load (10) that is to be detected, wherein a deformation transmission unit (6) is operatively arranged between the load carrier assembly and the sensor (3). A method, in which additionally a deformation transmission unit is used, is thus provided, which during operation picks up the deformation of the load carrier assembly and transmits it to the sensor as a changed force/path load.

20 Claims, 5 Drawing Sheets

(51) Int. Cl.
*G01L 1/22* (2006.01)
*G01L 5/00* (2006.01)
*G01L 5/06* (2006.01)
*G01L 5/103* (2020.01)
*G01L 5/108* (2020.01)

(52) U.S. Cl.
CPC .............. *G01L 5/0033* (2013.01); *G01L 5/06* (2013.01); *G01L 5/103* (2013.01); *G01L 5/108* (2013.01)

(58) Field of Classification Search
CPC ......... G01L 5/108; G01L 1/005; G01L 1/044; G01L 1/06; G01L 1/106; G01L 1/22; G01L 1/2212; G01L 1/2218; G01L 1/2231; G01L 1/2225; G01L 1/2237; G01L 1/2243; G01L 5/0028; G01L 5/04; G01L 5/10
USPC ................................................... 73/862.636
See application file for complete search history.

(56) References Cited

U.S. PATENT DOCUMENTS

| | | | | |
|---|---|---|---|---|
| 4,479,391 | A | | 10/1984 | Banik et al. |
| 4,544,858 | A | | 10/1985 | Nishiguchi et al. |
| 5,847,289 | A | * | 12/1998 | Lehnen .................... B60J 10/00 73/862.381 |
| 6,044,686 | A | * | 4/2000 | Dischler ................ B21D 39/04 29/237 |
| 7,404,338 | B2 | * | 7/2008 | Hierold ................ B81B 3/0021 73/514.35 |
| 7,779,523 | B2 | * | 8/2010 | Frenken ............... B21D 39/046 29/237 |
| 8,087,280 | B2 | * | 1/2012 | Battenfeld ................ B25B 7/00 72/392 |
| 8,966,998 | B2 | * | 3/2015 | Gentner ................. B60D 1/248 73/862.625 |
| 10,139,264 | B2 | * | 11/2018 | Lustenberger ......... B62D 33/02 |
| 2015/0160080 | A1 | * | 6/2015 | Fujisawa ............... G01L 1/2231 73/862.627 |

* cited by examiner

DEVICE AND METHOD FOR MEASURING A LOAD

The present invention relates to device for measuring a load according to the preamble of claim 1 and a method for measuring a load according to the preamble of claim 11. Load measuring devices of the mentioned type are widely used and serve to monitoring machine parts or all types of constructions over the short-term or the long-term. They are, for example, used for monitoring the permissible tension in the load-bearing cables of nets, which are used for stone chip protection or in building ground anchors. Such applications have in common that the operating loads in any element to be monitored, be it a cable or a drawbar, can become quite high, from a few hundred kilogrammes up to the range of several tonnes, wherein, for safety reasons, an overload protection is added to the operating load to account for a multiple times the operating load (three, five or even ten times).

In the case of safety nets for rockfall, for example, it is known that smaller boulders often fall as precursors to a larger rockfall, which must be reliably detected. Similarly, however, after larger pieces of rock fall, it must be possible to measure the load of the net as to whether it is still viable for use. For this purpose, a load measuring device must then be arranged in each cable of the net anchored to the ground.

The same applies to the example of a ground anchor. Minor ground movements must be detected, and, in the case of major ground shifts, the maximum load must be measured, which has impacted the individual anchors.

Among the numerous known embodiments of such load measuring devices for a wide variety of purposes, a differentiation can be made between those which are mounted on the cable or the drawbar itself, thereby measuring their deformation, and those that are arranged on the anchoring of the cable or the drawbar. In the case of these in turn, load measuring devices are known, which measure the deformation of the anchoring and those that are mounted directly between the cable or the drawbar and the anchoring, thereby being subjected to the load. In the latter case, which relates to the present invention, a cable is often pulled through the hole of a plate belonging to an anchoring and a thickening is arranged on the other side of the cable, which, being supported via an abutment on the plate, transmits the tension in the cable to the plate. In turn, the abutment is designed to measure the tensile forces transmitted by the cable.

For example, disc-shaped ring-load cells with a cylindrical outer side are known, which have a central hole, through which the cable runs. The tensile forces transmitted by the cable act on the top side of the ring-load cell, which, for its part, is supported on an anchor plate in such a way that its cylindrical outer circumference deforms in a drum-like manner and slightly arch towards the outside. This deformation can be detected by strain gauges. For the protection of the strain gauges, it is often provided to allow the base and the cover surface of the ring-load cell to protrude over the cylindrical outer side in a flange-like manner and to seal the chambers formed in this way with the strain gauges arranged therein by means of a metal plate welded to the flanges all around.

This has the advantage that such a ring-load cell has a long lifetime within the range of 10 years, however, thereby having the disadvantage that the drift prevalent within the strain gauges cannot be corrected in the measurement values. In addition, such ring-load cells are expensive, among other things, since at least four strain gauges are required: two on opposite sides of the ring-load cell respectively, which are arranged in an intersecting manner in order to compensate for temperature differences. To compensate for asymmetries in the ring-load cells, more than two pairs of strain gauges are often necessary.

Accordingly, it is the object of the present invention to create a device for measuring a load, which is designed to be less elaborate, cheaper, and simpler to produce, above all in great quantities.

This task is achieved by means of a device with the features of claim 1 and by means of a method with the features of claim 11.

By means of a deformation transmission unit for this load being provided between the load carrier assembly, which transmits the load transmitted via the cable or the drawbar onto an anchor plate, and the sensor, the load carrier assembly and the related sensors can be designed in a simple and therefore cost-effective manner. Above all, by means of this assembly, it is possible to provide less for reliable measurement data, for example, a single sensor.

In particular, by means of a deformation transmission unit being provided, which, during operation, picks up the deformation of the load carrier assembly and transmits it to the sensor as a changed force/path load during operation, it is made possible that a sensor is not on the load carrier assembly itself, but can be arranged at a distance from this, and that being without taking the geometry and deformation of the load carrier assembly into account. This allows for a cost-effective design of the load carrier assembly.

Beyond the object at hand, with the load detection unit according to the invention and with the method according to the invention, drift-proof vibrating wire sensors can be used, which allow for the maintenance for resetting a drift of the measurement values to be dispensed with, thereby being maintenance-free for a period of 10 years and beyond, in particular generating drift-proof and very ultra-precise measurement values.

Other preferred embodiments have the features of the dependent claims.

The present invention is described in somewhat more detail in the following based on the figures.

Figure 1:
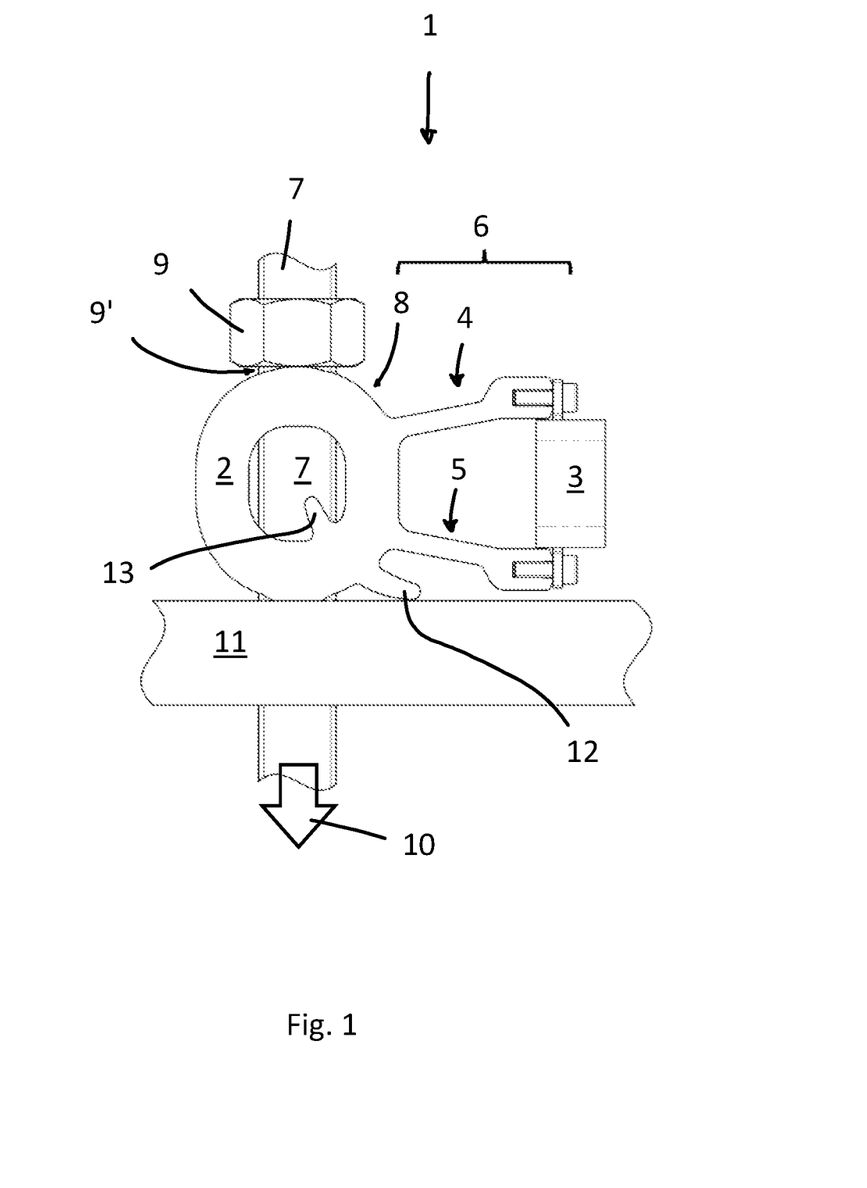
FIG. 1 a view of a mounted load detection unit according to the invention from the side, FIG. 2 another view of a load detection unit in accordance with FIG. 1, however, in an unmounted state.

FIG. 1 shows a preferred embodiment of a load detection unit 1, with a load carrier assembly designed here as a pipe profile 2, a sensor 3, as well as two lever assemblies 4 and 5, which together form a deformation transmission unit 6, which acts on the sensor 2.

A tension member designed here as a drawbar 7 protrudes through the pipe profile 2 from below and is screwed to its top side 8 using a nut 9 and a washer 9' so that the load 10 acting within the drawbar 7 acts on the top side 8 of the pipe profile 2 via the nut 9 and the washer 9' and this squishes against a schematically shown anchor plate 11. The anchor plate 11 is supported on the substrate or on a building or a component, which should receive the load of the tension member or the drawbar 7.

The pipe profile 2 is made of a spring-elastic material and is solid so that it can bear a load 10 and be overloaded, thereby corresponding to double, triple five-times or, for example ten times the load.

It has been shown that pipe profiles made of the desirable aluminium extrusion according to the invention are such that are designed as extrusion profiles, (see below regarding this), which do not yet deform under the maximum load, meaning that they would principally be dimensioned strongly enough, however would become "soft" very quickly and ultimately fail nevertheless after a comparably short time.

This means that the pipe profile 2 must be oversized depending on the alloy in the region of doubled overload. In turn, this results in the pipe profile being very rigidly dimensioned with regard to the simple load and the operating load and in being correspondingly deformed at a low level, which, in addition to space problems, correspondingly makes the detection of the deformation of the pipe profile 2 by deformation sensors more difficult, such as the strain gauges that are normally used for example.

According to the invention, a deformation transmission unit 6 is provided, which picks up the deformation of the pipe profile 2 and passes it on to the sensor 3 via a path/force transmission. Thereby, the path/force transmission is dimensioned in such a way that the sensor 3 is stressed in accordance with its input characteristics, meaning, it is subjected to a deformation path or a deformation force, for which it can generate a detection signal as intended. Here, it must be expressively noted that sensors are known, which detect either a deformation path or a deformation force. However, sensors are also known, which slightly deform themselves due to the force acting on them so that the path/force transmission according to the invention is not only to be understood as acting alternatively, but also acting cumulatively. With regard to this, see the description of the FIGS. 3a to 3d. As is evident from FIG. 1, in addition, the lever assemblies 4, 5 have softer dimensions, for example, being more pliable than the pipe profile 2.

A support 12 protruding from the pipe profile 2 against the anchor plate 11 holds the load detection unit 1 during assembly or maintenance in an approximate operating position, i.e. it hinders a tipping due to the weight of the deformation transmission unit and the sensor 3. A collar 13 projecting into the cavity of the pipe profile 2 serves as an installation safety in order to prevent that the drawbar 7 (or load cable) is mounted through the cavity of the pipe profile so that this, being tipped at 90°, for example, to the side face evident in the figure, abuts the anchor plate 11.

This results in a load detection unit according to the invention 1 having a spring-elastic load carrier assembly (shown here as a pipe profile 2) for receiving the load 10 and a sensor 3 for the deformation of the load carrier assembly, which occurs under the load 10 that is to be detected, wherein a deformation transmission unit 6 is operatively arranged between the load carrier assembly and the sensor 3.

Preferably, the deformation transmission unit is designed in such a way that it transmits at least one of the transmitted parameters, deformation movement and deformation force, to the sensor during operation, thereby transforming it/them.

Furthermore, this results in the load carrier assembly being designed as a hollow profile where the load acts transversely through a cavity of the profile during operation. For example, in the case of an exemplary embodiment not shown in the figures, a box-shaped hollow profile can be used, with a base and a cover surface parallel to the anchor plate, the side walls of which outwardly deform in the event of a load in a drum-shaped manner, wherein lever assemblies are then provided on one of the lateral surfaces that are similar to the lever assemblies 4, 5 in FIG. 1. In the case of such a hollow profile however, which has been determined by the person skilled in the art according to the case at hand, the load always acts transversely (and not axially for example) to the cavity so that this can be squished in the described manner and the deformation transmission unit can pick up this deformation as intended.

Ultimately, for the load carrier assembly, this results in it being designed as a pipe profile, as is shown in FIG. 1, where the load acts on a diameter of the pipe profile during operation. In addition to the embodiment as a general hollow profile, this embodiment has the advantage that the individual load carrier assembly can be manufactured as a simple step of the extrusion or the extrusion profile, preferably of an aluminium extrusion profile, being therefore comparably extraordinary inexpensive to manufacture, with the further advantage that the production is scalable in any way without further ado and without great investments.

Thereby, preferably, two lever assemblies 4, 5 are provided on the load carrier assembly according to the invention, whether this is designed as a hollow profile or not, said lever assemblies clamping the sensor 3 between each other. At this point, it is added that, according to the invention, a load carrier assembly can also be provided, which is constructed analogously to a ring-load cell, thus having a continuous opening, through which a drawbar or a pull cable protrudes so that the load lies along an axis passing through the opening during operation. Such a load carrier assembly must be designed by the person skilled in the art for the specific case at hand in such a way that the deformation of the load carrier assembly can be suitably picked up via the deformation transmission device according to the invention and can be transmitted by means of a force/path transmission to a sensor.

Figure 2:
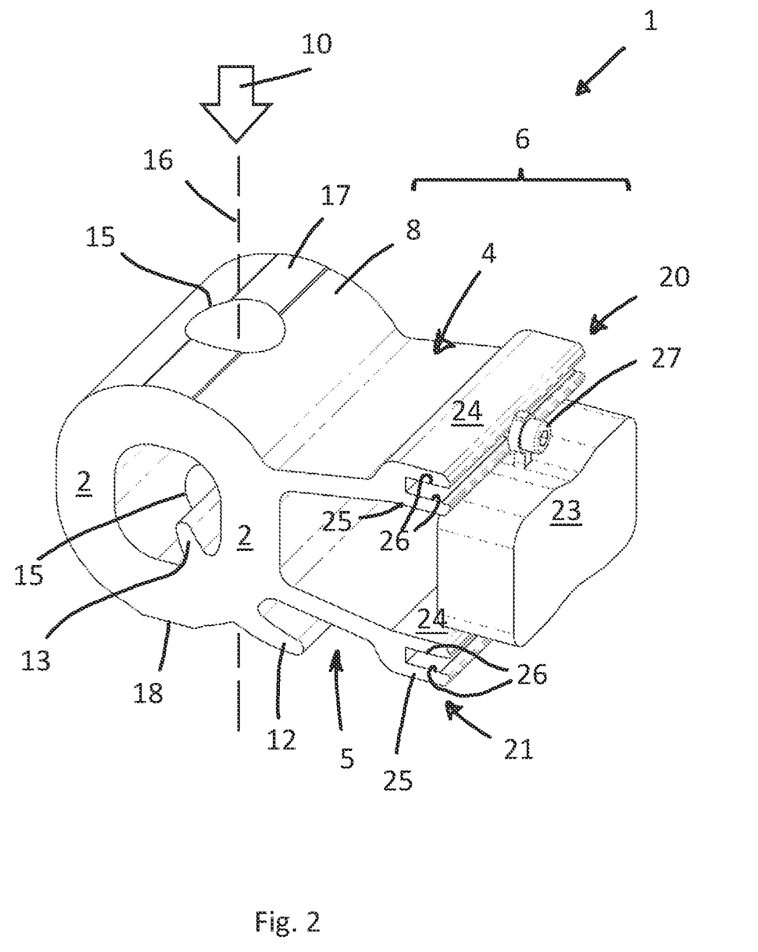

FIG. 2 shows an oblique view from above of the load detection unit in FIG. 1 to clarify its structure. As mentioned in FIG. 1, the load carrier assembly (pipe profile 2) together with the deformation transmission device 6 (here consisting of the two lever assemblies 4, 5) is designed as a single-piece extrusion profile, which is been cut off at a suitable length from a profile bar. A vertical bore hole 15 for a drawbar 7 (FIG. 1) or a pull cable has the axis 16 drawn in with the dotted line, in which the load 10 acts on the top side of the pipe profile 2. On the top side 8, a cambered bearing surface 17 for an inverted washer 9' (FIG. 1) is provided; the supporting surface 18 for an anchor plate 11 (FIG. 1) or another underlay is flat.

The flat form of the lever assemblies 4 and 5 is evident since these belong to the same cut section of the extrusion profile as the pipe profile 2.

Head regions 20 and 21 of the lever assemblies 4 and 5 are furthermore apparent, to which a vibrating wire sensor 23 is attached. In the case of the embodiment shown, each head region has a double collar 24, 25, which preferably have longitudinally running (i.e. running in the extrusion direction) parallel grooves 26 on its inner surfaces. These grooves 26 represent cut-outs of a counter-thread for the screws 27, by means of which the sensor 23 is operatively attached to the deformation transmission unit 6 (or their lever assemblies 4.5). In turn, such thread grooves can be produced in the simplest manner, and above all cost-effectively, by means of extrusion.

From FIG. 2 (which, like FIG. 1, is to scale), it is apparent that the thickness of the lever assemblies 4, 5 is reduced with regard to the wall thickness of the pipe profile 2 so that this is less rigid with regard to the pipe profile 2, meaning more pliable, i.e. more easily deformable. During operation, the pipe profile 2 deforms under the load 10 acting in the direction of the axis 16 in such a way that the vertical wall sections 27, 28 arch towards the outside so that the lever assemblies 4, 5 are compelled to spread apart from each other.

This results in a spring-elastically deformable profile according to the invention, preferably an extrusion profile, having a pipe-shaped section 2 and two flat lever assemblies 4, 5 arranged along its outer side with a lower thickness in comparison to the pipe-shaped section 2, which are arranged next to each other, however, at a distance to one another, and extend together away from the outer side of the pipe-shaped section, wherein, transversely to the pipe-shaped section 2, in its centre, and transversely to the flat extension of the lever assemblies 4, 5, an opening 15 formed to receive a load element is provided, wherein the pipe-shaped section 2 and the lever assemblies 4, 5 are designed in such a way that, in the case of a compression of the pipe-shaped section 2 occurring during operation in the direction of the axis 16 of the opening 15, this deforms in such a way that the lever assemblies 4, 5 spread apart. Preferably, the lever assemblies 4, 5 are designed to be more pliable than the hollow body section 33, which connects the lever assemblies 4, 5.

Furthermore, for an embodiment of the load detection unit according to the invention where a double collar (collars 24, 25) is respectively provided with thread grooves 26, which are provided with other inner services parallel to the length of the hollow body 2, on the outer ends of the flat levers 4, 5, wherein, preferably, a support 12 projects from the inner surfaces of the hollow body 2 into the inside of the cavity of the hollow body 2.

Furthermore, preferably, this result in the hollow body having a longitudinally running positioning surface 18 on its outer side, into which the opening 15 projects, and wherein, a longitudinally running load-bearing section 17, which is cambered in the transverse direction, preferably opposite to the flattening, is provided, into which the opening projects.

Figure 3A:
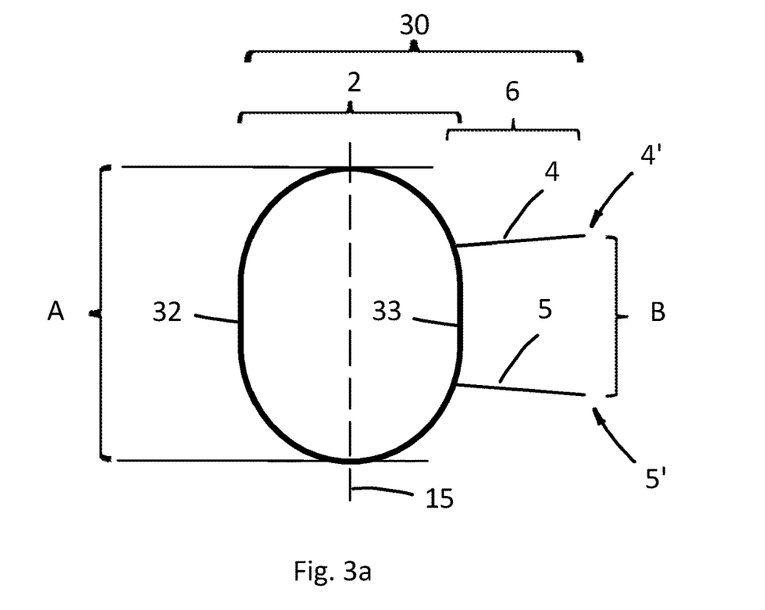
FIGS. 3a and 3b schematically, the load carrier unit of a load detection unit according to the invention in an unloaded and in a loaded state, FIGS. 3c and 3d schematically, the load carrier unit of a load detection unit according to the invention in the loaded state, wherein various sensor are used, FIG. 4 a load detection unit according to the invention with sensors designed as strain gauges, and FIG. 5 another embodiment according to the invention.

FIG. 3a schematically shows a cross-section through an extrusion profile 30 of a load detection unit according to the invention as a line drawing, which has a pipe profile 2 and two lever assemblies 4, 5 of a deformation transmission device 6 and is in an unloaded state (load 10 in FIG. 1). The anchor plate 11 (FIG. 1) is left out to not overburden FIGS. 3a to 3d. With the line drawing, the configuration of the load detection unit or its deformation under a load 10 (FIG. 1) should be illustrated and, thereby, in particular, the function of the deformation unit 6. It must be highlighted that the representation is in line with the preferred embodiment in accordance with FIGS. 1 and 2, however, analogously applies to all other configurations that have a load carrier assembly according to the invention with a deformation transmission device, which acts on one or a plurality of sensors and is configured by the person skilled in the art depending on the specific case at hand.

In FIGS. 3a to 3d, 4 and 5, A refers to the height of the pipe profile 2, which is not in a loaded state as mentioned, and B refers to the corresponding distance between the head ends 4', 5' of the lever assemblies 4, 5.

From FIG. 3a, it is apparent that, in the unloaded state, the pipe profile 2 is O-shaped in a cross-section with vertically running wall sections 32, 33 in the embodiment shown, and the lever assemblies protrude from the pipe profile 2 above and below the side section 33.

Figure 3B:
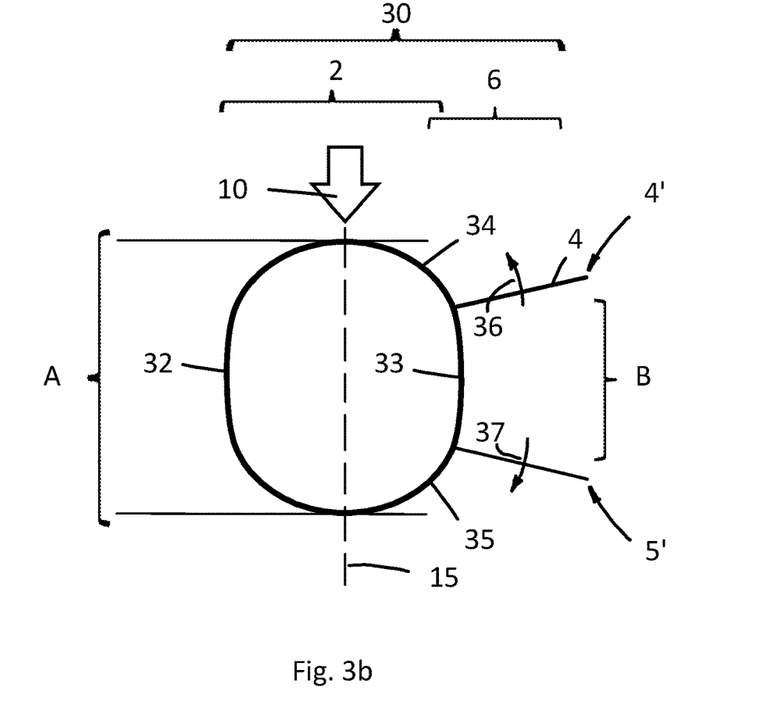
Figure 3C:
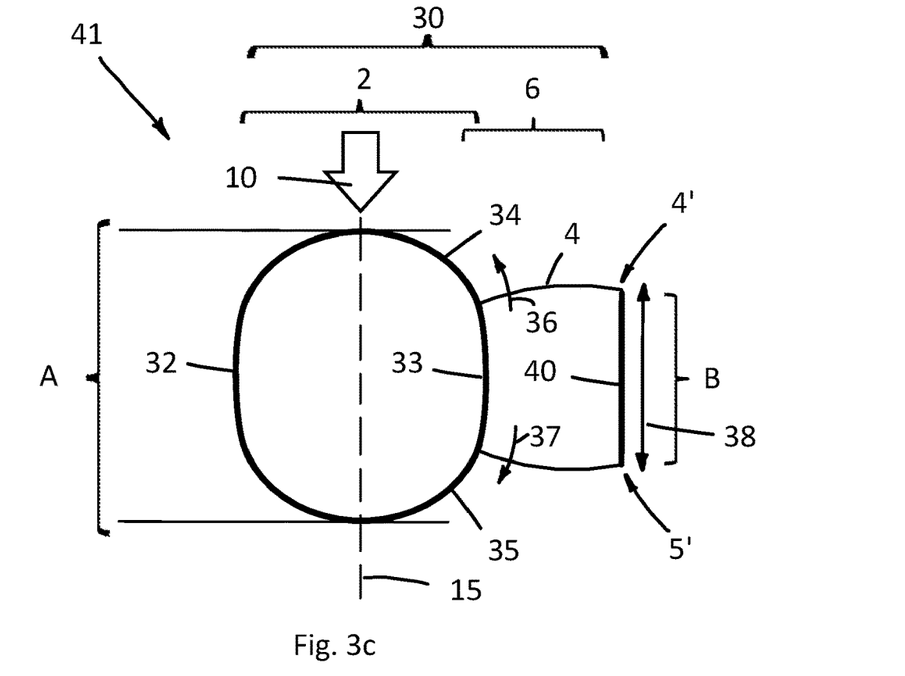

FIG. 3b shows the extruded section 30 under a load 10. It is apparent that the height of the pipe section 2 has become smaller than its original height A in the unloaded state. Accordingly, the vertical wall sections 32, 33 are slightly arched in a drum-shaped manner and the upper and lower rounding 34, 35 is somewhat flattened. By means of this, the inclination of the lever assemblies 4, 5 has intensified, which are both pivoted away from each other in the direction of the arrows 36, 37. The distance of their head ends 4', 5' has increased compared to the distance B in the unloaded state. Thereby, the deformation of the pipe profile 2 is comparably at a low level; the deformation on the head ends 4', 5' of the lever assemblies 4, 5 at a high level—there is a transformation or transmission ratio of the deformation path "difference in height of the pipe profile" to "distance of the head ends of the lever assemblies". The person skilled in the art can determine this transformation or transmission ratio by means of a suitable design on a specifically individual basis, for example, by means of the cross-section of the pipe profile (contour and wall thickness), the location of the joint of the lever assemblies and the length of the lever assemblies. FIG. 3c shows the extrusion profile 30 with a sensor 40, which is also shown schematically in a type of line drawing, meaning a load detection unit 41 according to the invention in a loaded state (wherein, as mentioned, the anchor plate 11 is dispensed with in FIG. 1 as to not overburden the figure).

In the case of the embodiment shown in FIG. 3c, the sensor 40 is or its mounting points on the head ends 4', 5' of the lever assemblies 4, 5 are not or are insignificantly deformable or displaceable and, despite the effect of the load 10, essentially still exhibit the distance B. Accordingly, the lever assemblies 4, 5 pivoted at their base in accordance with the arrows 3, 37 are bent in a spring-elastic manner and exert a pulling force on the sensor 40 in accordance with the double arrow 38. The parameter of this tensile load depends on the dimensioning of the lever assemblies 4, 5 (essentially, moment of inertia and length), and is a measurement for the deformation of the pipe profile 2 in the case of given dimensions. The person skilled in the art can determine the tensile load for a specific circumstance by means of suitably dimensioning the extrusion profile 30 to the input parameters of a sensor provided for use, here, sensor 40. Thereby, instead of the transformation or transmission ratio of the deformation path "difference in height of the pipe profile" to "distance of the head ends of the lever assemblies" (see the description above concerning FIG. 3b with regard to this), a transformation of the deformation path "difference in height of the pipe profile" to a "force impact on the sensor" can be spoken of, meaning a path for force transformation. This path for force transformation or transmission ratio results from the deformation of the lever assemblies 4, 5.

In particular, a profile results where the lever assembly (4, 5) are designed to be more pliable than the hollow body section (here of the wall section 33), which connects the lever assemblies (4, 5).

Figure 3D:
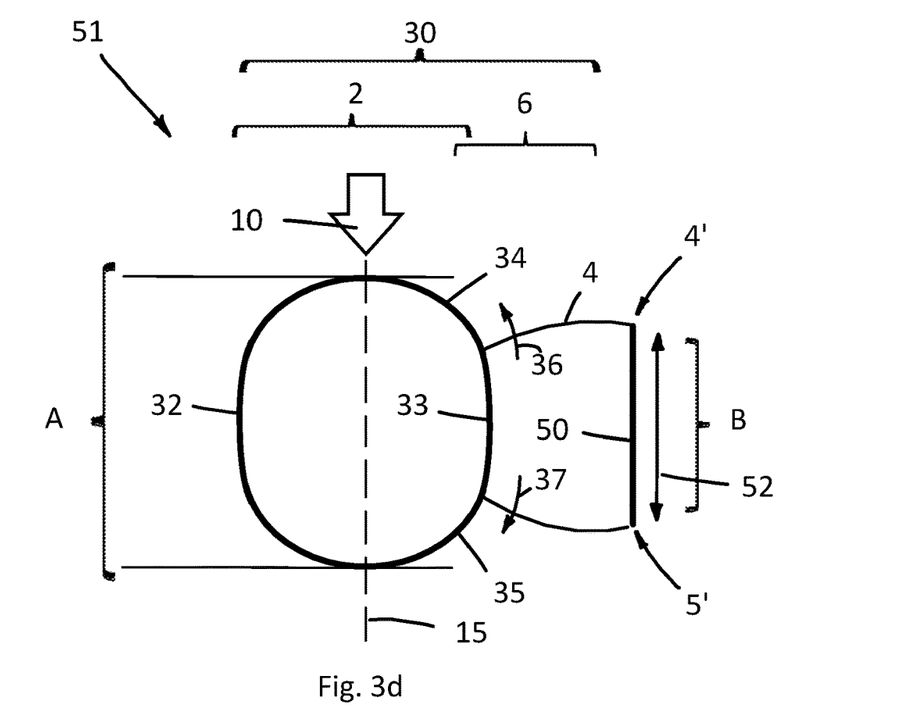

FIG. 3d shows the extrusion profile 30 with a sensor 50, which is also shown schematically in a type of line drawing, meaning a load detection unit 51 according to the invention in a loaded state. In contrast to sensor 40 in FIG. 3c, sensor 50 is deformable and its connection point is displaceable, as this is the case with a vibrating wire sensor for example. A vibrating wire sensor is favourably drift-proof, cheap and can be easily encapsulated.

Accordingly, the curvature of the lever assemblies 4, 5 end up being somewhat smaller along with the tensile force, which is exerted on the sensor 50 on the head ends 4', 5' in accordance with the double arrow 52.

A transformation of the deformation path results entailing "the difference in the height of the pipe profile" into "the distance of the head ends of the lever assemblies" together with a "force impact on the sensor".

As mentioned, now, the person skilled in the art can determine this transformation or transmission ratio with regard to the assigned sensor (3, 23, 40, 50 or 70) in such a way that a suitable path of the deformation transmission unit at the location of the assigned sensor corresponds to a deformation path of the load carrier assembly, or a suitable force impact on the assigned sensor or, preferably, a suitable combination. Thereby, a suitable path, a suitable force or a suitable combination of path and force is a path, a force or a combination of path and force, which correspond to the intended input values of the assigned sensor.

A load detection unit results where the deformation transmission unit 6 has at least one lever assembly 4, 5 connected to the load carrier assembly, which is moved by a deformation movement of the load carrier assembly 2 caused by an operational load and, by means of this, carries out a transmission movement and/or exerts a transmission force on the sensor 3 (which correspond(s) to the input characteristics of the sensor 3).

Figure 4:
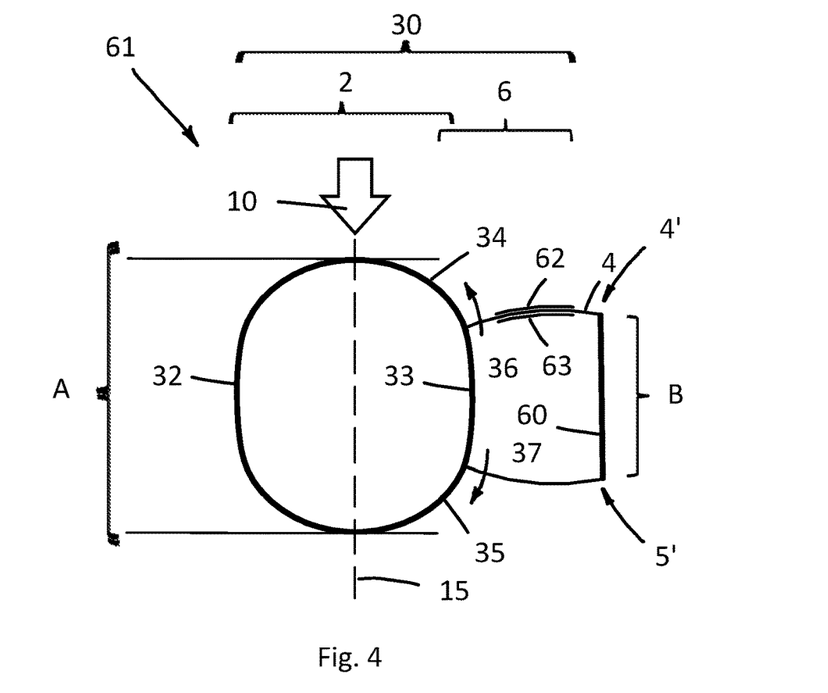
Figure 5:
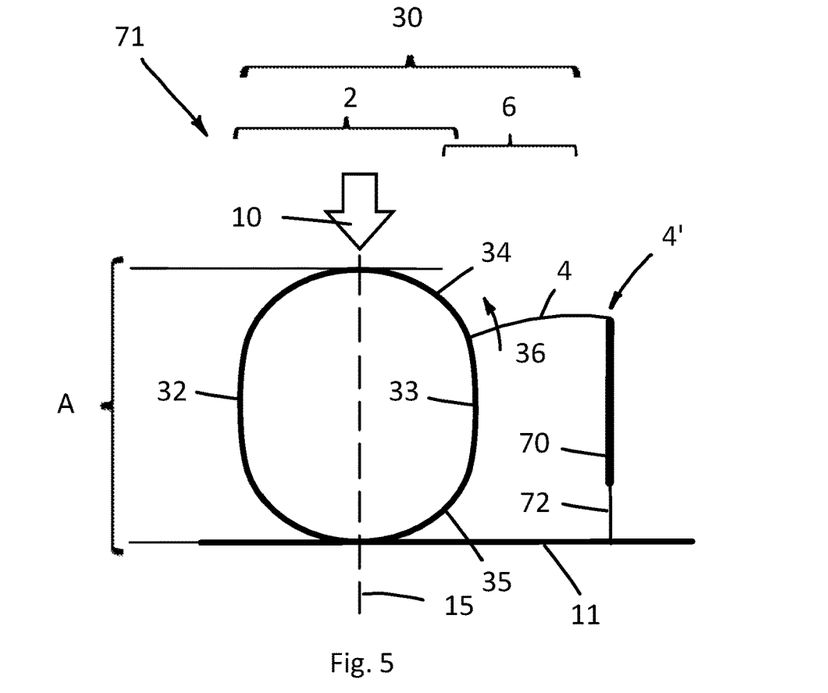

FIG. 4 schematically shows a load detection unit 61 in accordance with the one other embodiment of the present invention. The head ends of the lever assemblies 4, 5 are connected to each other at distance B via a rigid carrier 60. Due to the impact of the load 10, the lever assemblies 4, 5 bend in the same way, as is the case with the rigid sensor 40 in FIG. 3c. In the present document, this bend is now detected by, for example, by means of strain gauges 62, 63, which is, in turn, a measurement for the load 10. A transformation of the deformation of the pipe profile results, i.e. "Difference of the height of the pipe profile" to a more intense deformation, "bend of the lever assembly". In turn, the person skilled in the art can design this transformation by dimensioning the load carrier assembly and the deformation transmission unit in a suitable manner with regard to the strain gauges to be used. FIG. 5 schematically shows a load detection unit 71 provided with a sensor 70, which has only one lever assembly 4, wherein the sensor 70 is fixed to the anchor plate 11 via a carrier 72 (or also only relative to this).

In summary, by means of an (intended, see above) comparably low level of deformation of the pipe profile or of the load carrier assembly, a sensor is stressed in accordance with its input parameters (force/path), wherein the person skilled in the art can design this stress by appropriately dimensioning the deformation transmission unit and the load carrier assembly on the sensor used.

It results that the deformation transmission unit according to the invention preferably has at least one lever assembly, which is connected to the load carrier assembly, and, during operation, absorbs a deformation of the load carrier assembly occurring under the impacting load and transmits this to the sensor as a stress load.

Furthermore, a load detection unit results where the deformation transmission unit is preferably at least partially spring-elastic in such a way that it deforms in the case of a deformation of the load carrier assembly caused by a load in a predetermined manner.

Furthermore, in one embodiment of the invention, a load detection unit results, where the sensor is designed as a force-detecting sensor, preferably as a vibrating wire sensor and wherein deformation transmission unit deforms in a spring-elastic manner during operation in such a way that the movement of the deformation transmission unit to the force-detecting sensor is reduced at the connection point, preferably essentially being eliminated.

Furthermore, in an embodiment of the invention, a load detection unit results, where the sensor is designed as a path-detecting sensor, preferably as a strain gauge, and the deformation transmission unit is designed in such a way that the movement of the deformation transmission unit at the connection point to the path-detection sensor preferably ends up being transformed with a ratio, preferably increased, with regard to the deformation picked up at the load carrier assembly.

Ultimately, in an embodiment of the invention, a load detection unit results where the sensor detects a deformation path, a force or a combination of a force and a path.

The method for measuring a load according to the invention having a spring-elastic load carrier assembly for receiving the load and a sensor for the deformation of the load carrier assembly, which occurs under the load that is to be detected entails that a deformation transmission unit is additionally provided, which picks up the deformation of the load carrier assembly during operation and transmits it as a changed force/path stress load to the sensor as at least one of the parameters resulting from the stress loads due to form and path so that one in the result transmits a force/path stress load to the sensor, which force/path stress load has changed with relation to the deformation of the load carrier assembly. Thereby, the at least one of the parameters resulting during the deformation of the load carrier assembly, such as the deformation force and the deformation path, is preferably transformed or transmitted with a ratio by the deformation transmission unit in such a way that the transformed parameters correspond to the input characteristics of the assigned sensor.

Preferably, a string vibrating sensor is used as a sensor, wherein the deformation transmission unit is designed to be spring-elastic in such a way that a predetermined operating force acts on the vibrating wire sensor (in the case of a predetermined operating load) in the case of a predetermined operating force.

Being furthermore preferred, at least one strain measuring element, preferably a strain gauge, is used as a sensor and this is arranged on a spring-elastic region of the deformation transmission unit, wherein the spring-elasticity of this region is designed in such a way that its deformation is greater than the deformation of the load carrier assembly.

The invention claimed is:
1. A load detection unit comprising:
a spring-elastic load carrier assembly for receiving an operating load;
a sensor for the deformation of the load carrier assembly, which deformation occurs under the operating load that is to be detected;
wherein the load carrier assembly comprises a section that is deformed in operation by the operating load and a deformation transmission unit is operatively arranged between the load carrier assembly and the sensor; and
wherein the load carrier assembly, a connection of the load-carrier assembly to the deformation unit, and the deformation unit are all free of hinges.
2. The load detection unit according to claim 1, wherein the deformation transmission unit is designed in such a way that the deformation transmission unit transmits at least one of the transmitted parameters, deformation movement and deformation force, to the sensor during operation, thereby transforming the transmitted parameters with a ratio.

3. The load detection unit according to claim 1, wherein the load carrier assembly is designed as a hollow profile where the load acts transversely through a cavity of the profile.

4. The load detection unit according to claim 1, wherein the load carrier assembly is designed as a hollow profile where the load preferably acts on a diameter of a pipe profile during operation.

5. The load detection unit according to claim 1, wherein the load carrier assembly has a continuous opening, wherein the load lies along an axis passing through the opening.

6. The load detection unit according to claim 1, wherein the deformation transmission unit has at least one lever assembly, which is moved by a deformation movement of the load carrier assembly caused by an operational load and, by means of this, a transmission movement is carried out and/or a transmission force is exerted on the sensor.

7. The load detection unit according to claim 1, wherein the deformation transmission unit has at least one lever assembly, which is connected to the load carrier assembly, and, during operation, picks up a deformation of the load carrier assembly occurring under the impacting load and transmits this to the sensor as a stress load.

8. The load detection unit according to claim 1 wherein the deformation transmission unit has two lever assemblies, which clamp the sensor between them.

9. The load detection unit according to claim 1, wherein the deformation transmission unit is at least partially spring-elastic in such a way that it deforms in the case of a deformation of the load carrier assembly caused by a load in a predetermined manner.

10. The load detection unit according to claim 1, wherein the sensor is designed as a force-detecting sensor, preferably as a vibrating wire sensor and, wherein the formation transmission unit deforms in a spring-elastic manner during operation in such a way that the movement of the deformation transmission unit to the force-detecting sensor is reduced at the connection point, preferably essentially being eliminated.

11. The load detection unit according to claim 1, wherein the sensor is designed as a path-detecting sensor, preferably as a strain gauge, and the deformation transmission unit is preferably designed in such a way that the movement of the deformation transmission unit at the connection point to the path-detecting sensor is increased with regard to the deformation picked up at the load carrier assembly.

12. The load detection unit according to claim 1, wherein the sensor detects at least one of the parameters, deformation path or force.

13. A spring-elastically deformable profile, comprising:
a hollow body;
two flat lever assemblies arranged along an outer side of the hollow body with a lower thickness in comparison to a pipe-shaped section, which are arranged next to each other, however, at a distance to one another, and extend together away from the outer side of the pipe-shaped section;
wherein, transversely to the pipe-shaped section, in a centre of the pipe-shaped section and transversely to a flat extension of the flat lever assemblies, an opening formed to receive a load element is provided;
wherein the pipe-shaped section and the lever assemblies are designed in such a way that, in the case of a compression of the pipe-shaped section by an operational load occurring during operation in the direction of the axis of the opening, this deforms in such a way that the lever assemblies spread apart; and
wherein the profile is free of hinges.

14. The spring-elastically deformable profile according to claim 13, wherein the two flat lever assemblies are designed to be more pliable than a hollow body section, which connects the two flat lever assemblies.

15. The spring-elastically deformable profile according to claim 13, wherein a double collar is provided on outer ends of the flat lever assemblies with thread grooves provided on their inner surfaces parallel to the length of the hollow body, wherein, preferably, a support projects from the inner surfaces of the hollow body into the inside of the cavity of the hollow body.

16. The spring-elastically deformable profile according to claim 13, wherein the hollow body has a longitudinally running positioning surface on its outer side, into which the opening projects, and whereby, a longitudinally running load-bearing section, which is cambered in the transverse direction, preferably opposite to the flattening, is provided, into which the opening projects.

17. The spring-elastically deformable profile according to claim 13, wherein the spring-elastically deformable profile is designed as an extrusion or an extrusion profile.

18. A method for measuring an operational load having a spring-elastic load carrier assembly for receiving the operational load and a sensor for the deformation of the load carrier assembly, which occurs under the operational load that is to be detected, wherein a hinge-free deformation transmission unit is additionally provided, which picks up the deformation of the load carrier assembly during operation and transmits it as a changed force/path stress load to the sensor in such a way that the sensor is stressed in accordance with input characteristics of the sensor.

19. The method according to claim 18, wherein a string vibrating sensor is used as a sensor and wherein the deformation transmission unit is designed to be spring-elastic in such a way that a predetermined operating force acts on the vibrating wire sensor in the case of a predetermined operating load.

20. The method according to claim 18, where at least one strain measuring element, preferably a strain gauge, is used as a sensor and this is arranged on a spring-elastic region of the deformation transmission unit, wherein the spring-elasticity of this region is designed in such a way that its deformation is greater than the deformation of the load carrier assembly.

* * * * *